United States Patent
Blasco-Allue et al.

(10) Patent No.: US 9,557,999 B2
(45) Date of Patent: Jan. 31, 2017

(54) LOOP BUFFER LEARNING

(75) Inventors: Conrado Blasco-Allue, Sunnyvale, CA (US); Ian D. Kountanis, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 778 days.

(21) Appl. No.: 13/524,508

(22) Filed: Jun. 15, 2012

(65) Prior Publication Data

US 2013/0339700 A1   Dec. 19, 2013

(51) Int. Cl.
G06F 9/38   (2006.01)

(52) U.S. Cl.
CPC ...................................... G06F 9/381 (2013.01)

(58) Field of Classification Search
CPC ....................................................... G06F 9/381
See application file for complete search history.

(56) References Cited

U.S. PATENT DOCUMENTS

| | | | |
|---|---|---|---|
| 5,303,357 A | 4/1994 | Inoue et al. | |
| 5,493,566 A | 2/1996 | Ljungberg et al. | |
| 5,701,435 A | 12/1997 | Chi | |
| 5,809,326 A | 9/1998 | Nogami | |
| 5,893,142 A | 4/1999 | Moyer et al. | |
| 5,951,679 A | 9/1999 | Anderson et al. | |
| 6,052,776 A | 4/2000 | Miki et al. | |
| 6,076,159 A | 6/2000 | Fleck et al. | |
| 6,269,440 B1 | 7/2001 | Fernando et al. | |
| 6,671,799 B1 * | 12/2003 | Parthasarathy | ............... 712/241 |
| 6,748,523 B1 | 6/2004 | Singh et al. | |
| 6,950,929 B2 | 9/2005 | Chung et al. | |
| 6,959,379 B1 | 10/2005 | Wojcieszak et al. | |
| 6,963,965 B1 | 11/2005 | Anderson | |
| 7,278,013 B2 | 10/2007 | Booth | |
| 7,302,557 B1 | 11/2007 | Hwu et al. | |
| 7,873,820 B2 | 1/2011 | Knoth | |
| 2002/0178350 A1 | 11/2002 | Chung et al. | |
| 2003/0163679 A1 | 8/2003 | Ganapathy et al. | |
| 2004/0123075 A1 * | 6/2004 | Almog | .......................... 712/207 |

(Continued)

FOREIGN PATENT DOCUMENTS

| | | |
|---|---|---|
| EP | 1107110 A2 | 6/2001 |
| GB | 2375852 | 11/2002 |

(Continued)

OTHER PUBLICATIONS

Extended Search Report in European Application No. 13171667.2, mailed Mar. 27, 2014, pp. 1-5.

(Continued)

*Primary Examiner* — Jacob A Petranek
(74) *Attorney, Agent, or Firm* — Rory D. Rankin; Meyertons, Hood, Kivlin, Kowert & Goetzel, P.C.

(57) ABSTRACT

Methods, apparatuses, and processors for tracking loop candidates in an instruction stream. A load buffer control unit detects a backwards taken branch and starts tracking the loop candidate. The control unit tracks taken branches of the loop candidate, and keeps track of the distance to each taken branch from the start of the loop. If the distance to each taken branch stays the same over multiple iterations of the loop, then the loop is stored in a loop buffer. The loop is then dispatched from the loop buffer, and the front-end of the processor is powered down until the loop terminates.

19 Claims, 9 Drawing Sheets

(56) References Cited

U.S. PATENT DOCUMENTS

| | | | |
|---|---|---|---|
| 2004/0193858 A1 | 9/2004 | Ahmad et al. | |
| 2005/0015537 A1 | 1/2005 | Asaad et al. | |
| 2006/0095750 A1 | 5/2006 | Nye et al. | |
| 2006/0107028 A1* | 5/2006 | Meuwissen et al. | 712/241 |
| 2006/0242394 A1 | 10/2006 | Uchiyama | |
| 2007/0113058 A1 | 5/2007 | Tran et al. | |
| 2007/0113059 A1* | 5/2007 | Tran | 712/241 |
| 2007/0130450 A1 | 6/2007 | Chiao et al. | |
| 2009/0113192 A1* | 4/2009 | Hall et al. | 712/241 |
| 2009/0217017 A1* | 8/2009 | Alexander et al. | 712/241 |
| 2010/0064106 A1 | 3/2010 | Yamada et al. | |
| 2011/0107071 A1 | 5/2011 | Jacob (Yaakov) | |
| 2011/0252118 A1 | 10/2011 | Pantos et al. | |
| 2011/0298509 A1 | 12/2011 | Khoury et al. | |
| 2012/0079303 A1 | 3/2012 | Madduri | |
| 2012/0185714 A1* | 7/2012 | Chung et al. | 713/323 |
| 2013/0339699 A1 | 12/2013 | Blasco-Allue et al. | |
| 2015/0227374 A1 | 8/2015 | Blasco et al. | |

FOREIGN PATENT DOCUMENTS

| | | |
|---|---|---|
| JP | S63314644 A | 12/1988 |
| JP | H04307624 A | 10/1992 |
| JP | H04307625 A | 10/1992 |
| JP | H0991136 A | 4/1997 |
| JP | H10154098 A | 6/1998 |
| JP | H10177482 A | 6/1998 |
| JP | 2000298587 A | 10/2000 |
| JP | 2001195302 A | 7/2001 |
| JP | 2002516425 A | 6/2002 |
| JP | 2004038601 A | 5/2004 |
| JP | 2010066892 A | 3/2010 |
| TW | I362001 | 4/2012 |
| WO | WO9960460 A2 | 11/1999 |
| WO | 0237271 | 5/2002 |

OTHER PUBLICATIONS

International Search Report and Written Opinion in application No. PCT/US2013/043328 mailed Dec. 16, 2013 pp. 1-10.
Office Action in Japanese Patent Application No. 2013-125334, mailed Aug. 4, 2014, 12 pages.
Notice of Preliminary Rejection in Korean Patent Application No. 10-2013-68355, mailed Aug. 18, 2014, 10 pages.
Final Office Action in Japanese Patent Application No. 2013-125334, mailed Jan. 15, 2015, 10 pages.
Panis, et al., "A Scalable Instruction Buffer and Align Unit for xDSPcore", IEEE Journal of Solid-State Circuits, IEEE Service Center, Piscataway, NJ, USA, vol. 39, No. 7, Jul. 1, 2004 (Jul. 1, 2004), pp. 1094-1100, XP001224111, ISSN: 0018-9200, DOI: 10.1109/JSSC.2004.829411.
Extended Search Report in EP Application No. 13170364.7-1957, Oct. 22, 2013, pp. 1-8.
International Search Report and Written Opinion in application No. PCT/US2013/043335 mailed Dec. 13, 2013 pp. 1-12.
Zuluaga et al. "Introducing Control-Flow Inclusion to Support Pipelining in Custom Instruction Set Extensions." In: Symposium on Application Specific Processors. Jul. 28, 2009 (Jul. 28, 2009). [Retrieved on Dec. 1, 2013]. Retrieved from the Internet: <URL: http://www1.cs.ucr.edu/faculty/philip/papers/conferences/sasp09/sasp09-ise.pdf>, entire document.
Office Action in Japanese Patent Application No. 2013-125335, mailed Aug. 4, 2014, 8 pages.
Notice of Preliminary Rejection in Korean Patent Application No. 10-2013-68472, mailed Aug. 18, 2014, 10 pages.
ChiTa Wu, Ang-Chih Hsieh, and TingTing Hwang "Instruction Buffering for Nested Loops in Low-Power Design" IEEE Transactions on Very Large Scale Integration (VLSI) Systems, vol. 14, No. 7, Jul. 2006; Publisher: Institute of Electrical and Electronics Engineers Inc. pp. 1-5.
Final Office Action in Japanese Patent Application No. 2013-125335, mailed Jan. 7, 2015, 4 pages.
Final Office Action in U.S. Appl. No. 13/524,478, mailed Jul. 9, 2015, 21 pages.
Notification of the First Office Action in Chinese Application No. 201310353450.4, mailed May 6, 2015, 26 pages.
Notification of the First Office Action in Chinese Application No. 201310233540.X, mailed Jul. 1, 2015, 18 pages.
Office Action in Taiwan Patent Application No. 102121215, mailed Jul. 22, 2015, 12 pages.
Notification of the Second Office Action in Chinese Application No. 201310233540.X, mailed Mar. 4, 2016, 7 pages.
Non-Final Office Action in U.S. Appl. No. 14/179,204, mailed Feb. 10, 2016, 7 pages.
Notification of the Third Office Action in Chinese Application No. 201310233540.X, mailed Jun. 14, 2016, 7 pages.
Non-Final Office Action in U.S. Appl. No. 13/524,478, mailed Mar. 19, 2015, 19 pages.
Office Action in Taiwan Patent Application No. 102121212, mailed Feb. 25, 2015, 15 pages.
Communication pursuant to Article 94(3) EPC in European Application No. 13171667.2, mailed Mar. 3, 2015, 5 pages.
Non-Final Office Action in U.S. Appl. No. 13/524,478, mailed Oct. 13, 2016, 12 pages.

* cited by examiner

Sample Program Code of Loop 100

| Address | Instruction |
|---|---|
| 0001 | Instruction 102 |
| 0002 | Instruction 104 |
| 0003 | Branch 106 |
| ⋮ | ⋮ |
| 0025 | Instruction 108 |
| 0026 | Branch 110 |
| ⋮ | ⋮ |
| 0077 | Instruction 112 |
| 0078 | Instruction 114 |
| 0079 | Branch 116 |

Uops per Instruction Table 120

| Instruction | Number of Uops |
|---|---|
| 102 | 1 |
| 104 | 1 |
| 106 | 1 |
| 108 | 3 |
| 110 | 1 |
| 112 | 2 |
| 114 | 4 |
| 116 | 1 |

Branch Tracking Table 130

| Number of Uops From Start of Loop |
|---|
| 2 |
| 6 |
| 13 |
| ⋮ |

FIG. 5

LOOP BUFFER LEARNING

BACKGROUND

Field of the Invention

The present invention relates generally to processors, and in particular to methods and mechanisms for identifying and learning the characteristics of a loop within an instruction stream.

Description of the Related Art

Modern day processors are generally structured as multiple stages in a pipelined fashion. Typical pipelines often include separate units for fetching instructions, decoding instructions, mapping instructions, executing instructions, and then writing results to another unit, such as a register. An instruction fetch unit of a microprocessor is responsible for providing a constant stream of instructions to the next stage of the processor pipeline. Typically, fetch units utilize an instruction cache in order to keep the rest of the pipeline continuously supplied with instructions. The fetch unit and instruction cache tend to consume a significant amount of power while performing their required functions. It is a goal of modern microprocessors to reduce power consumption as much as possible, especially for microprocessors that are utilized in battery-powered devices.

In many software applications, the same software steps may be repeated many times to perform a specific function or task. In these situations, the fetch unit will continue to fetch instructions and consume power even though the same loop of instructions are continuously being executed. If the loop could be detected and cached in a loop buffer, then the fetch unit could be shutdown to reduce power consumption while the loop executes. However, it is difficult to detect and learn a loop of instructions within program code when the loop includes multiple branches. It is also challenging to accurately determine if the loop is invariant prior to caching the loop in the loop buffer.

SUMMARY

Apparatuses, processors and methods for detecting and tracking loops within an instruction stream are disclosed. A processor pipeline may include a loop buffer and a loop buffer control unit. The loop buffer control unit may detect loop termination branches in the instruction stream. In one embodiment, when the loop buffer control unit detects a loop termination branch, the control unit may latch the instruction address of the loop termination branch, a loop detection flag may be set, and a loop iteration counter and a uop counter may be started.

The next time the same loop termination branch is detected, the control unit may compare the value of the uop counter to the size of the loop buffer. If the value of the uop counter is greater than the size of the loop buffer, then this loop candidate is not capable of being stored in the loop buffer, and so loop tracking will be terminated. If the uop counter is less than the size of the loop buffer, then the contents of the loop may be tracked for multiple iterations of the loop. For each iteration of the loop, if the contents of the loop stay the same during the iteration, then the loop iteration counter may be incremented and loop tracking may continue.

In one embodiment, the taken branches of the loop may be tracked during each iteration of the loop. The distance from the start of the loop to each taken branch may be stored in a branch tracking table during the first iteration of the loop, and during subsequent iterations of the loop, the value of the uop counter when a branch is detected may be compared to the corresponding value stored in the branch tracking table. If the distances from the start of the loop to the branches of the loop are invariant, then loop tracking may continue. When the value of the loop iteration counter exceeds a predetermined threshold, then the loop may be cached in the loop buffer. The loop may be read from the loop buffer and the fetch unit may be shutdown until the loop terminates.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 5 is one embodiment of a sample loop.

DETAILED DESCRIPTION OF EMBODIMENTS

Figure 1:
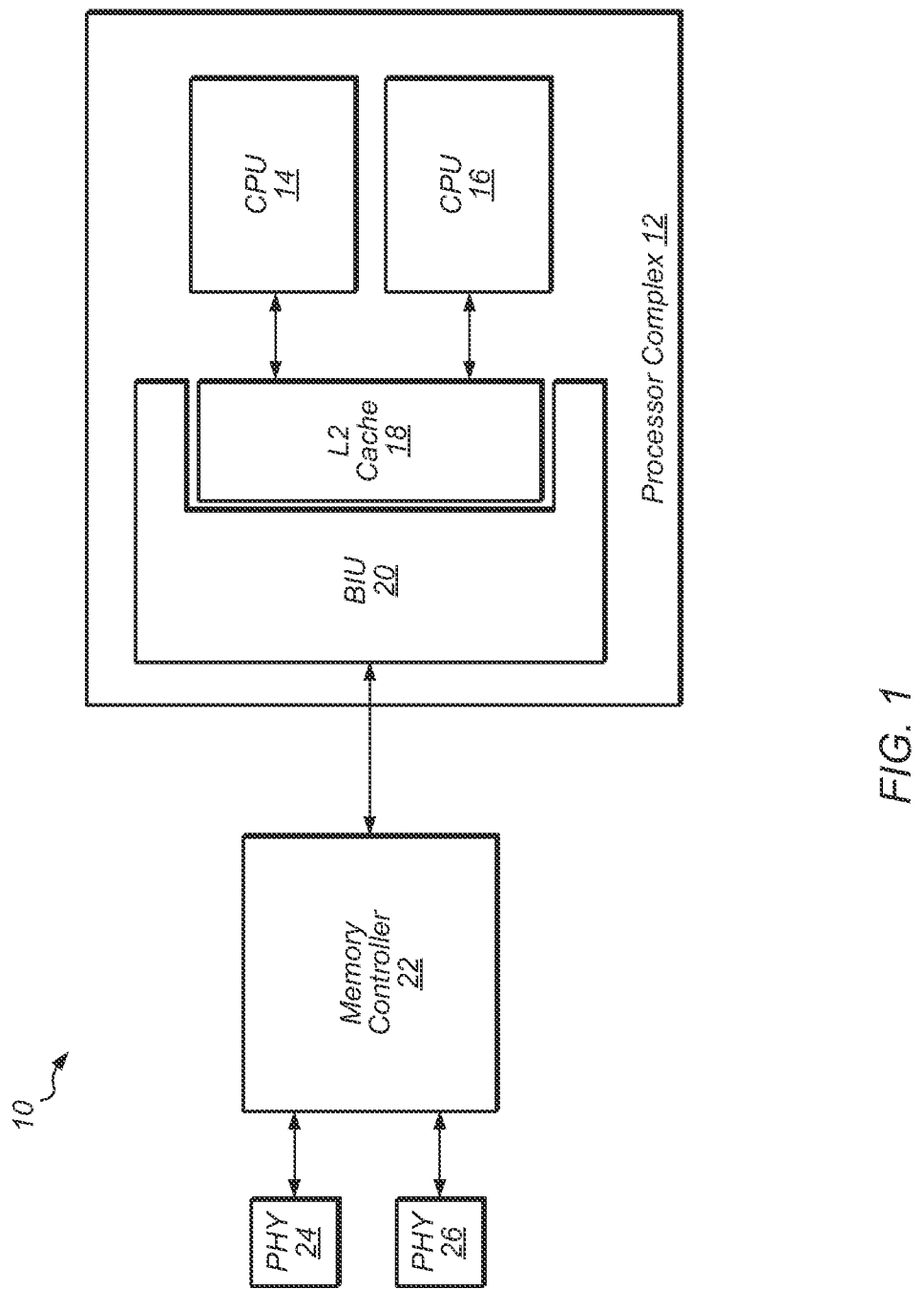
FIG. 1 illustrates one embodiment of a portion of an integrated circuit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a loop buffer control unit . . . ." Such a claim does not foreclose the processor from including additional components (e.g., a cache, a fetch unit, an execution unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes a processor complex 12, memory controller 22, and memory physical interface circuits (PHYs) 24 and 26. It is noted that IC 10 may also include many other components not shown in FIG. 1. In various embodiments, IC 10 may also be referred to as a system on chip (SoC), an application specific integrated circuit (ASIC), or an apparatus.

Processor complex 12 may include central processing units (CPUs) 14 and 16, level two (L2) cache 18, and bus interface unit (BIU) 20. In other embodiments, processor complex 12 may include other numbers of CPUs. CPUs 14 and 16 may also be referred to as processors or cores. It is noted that processor complex 12 may include other components not shown in FIG. 1.

The CPUs 14 and 16 may include circuitry to execute instructions defined in an instruction set architecture. Specifically, one or more programs comprising the instructions may be executed by CPUs 14 and 16. Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In one embodiment, each instruction executed by CPUs 14 and 16 may be associated with a PC value. Also, one or more architectural registers may be specified within some instructions for reads and writes. These architectural registers may be mapped to actual physical registers by a register rename unit. Furthermore, some instructions (e.g., ARM Thumb instructions) may be broken up into a sequence of instruction operations (or micro-ops), and each instruction operation of the sequence may be referred to by a unique micro-op (or uop) number.

Each of CPUs 14 and 16 may also include a level one (L1) cache (not shown), and each L1 cache may be coupled to L2 cache 18. Other embodiments may include additional levels of cache (e.g., level three (L3) cache). In one embodiment, L2 cache 18 may be configured to cache instructions and data for low latency access by CPUs 14 and 16. The L2 cache 18 may comprise any capacity and configuration (e.g. direct mapped, set associative). L2 cache 18 may be coupled to memory controller 22 via BIU 20. BIU 20 may also include various other logic structures to couple CPUs 14 and 16 and L2 cache 18 to various other devices and blocks.

Memory controller 22 may include any number of memory ports and may include circuitry configured to interface to memory. For example, memory controller 22 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 22 may also be coupled to memory physical interface circuits (PHYs) 24 and 26. Memory PHYs 24 and 26 are representative of any number of memory PHYs which may be coupled to memory controller 22. Memory PHYs 24 and 26 may be configured to interface to memory devices (not shown).

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
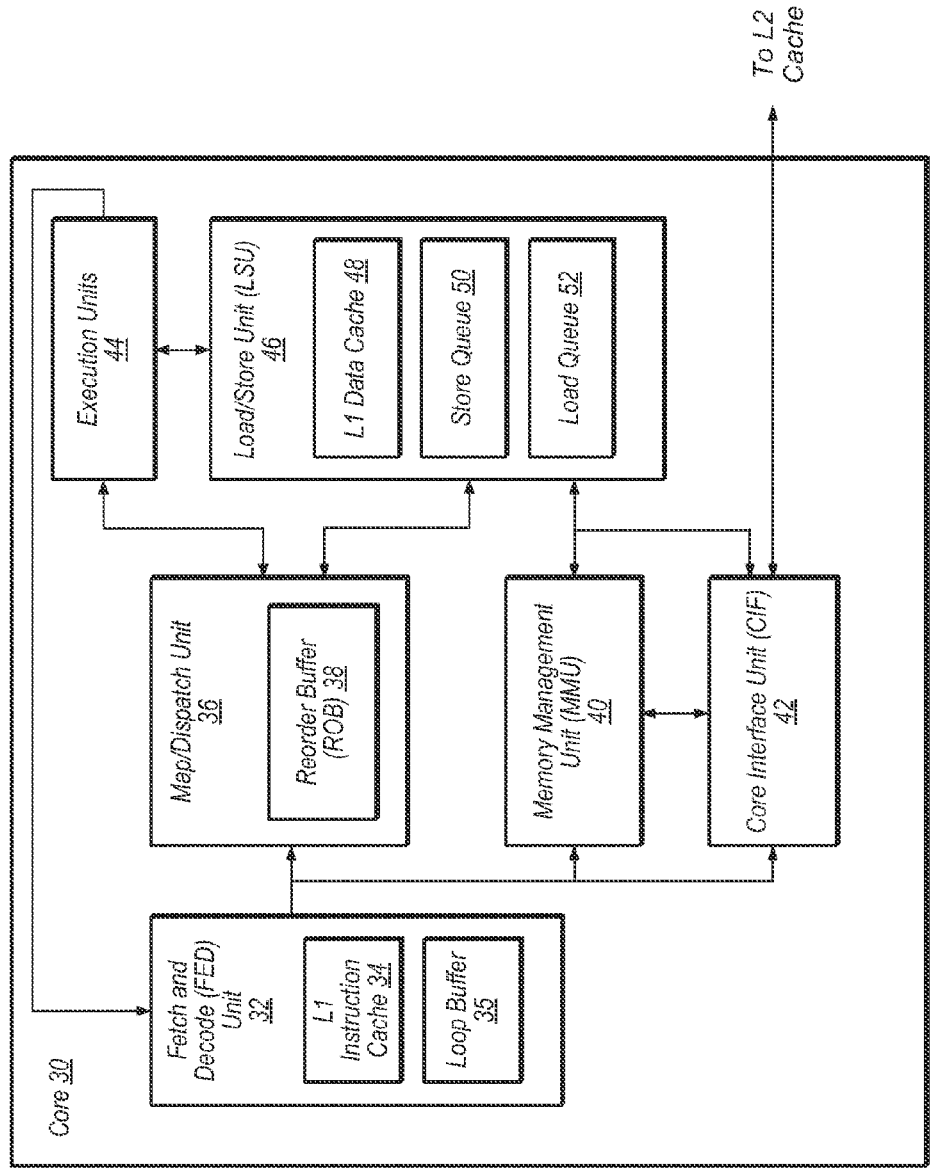
FIG. 2 is a block diagram that illustrates one embodiment of a processor core.

Turning now to FIG. 2, one embodiment of a processor core is shown. Core 30 is one example of a processor core, and core 30 may be utilized within a processor complex, such as processor complex 12 of FIG. 1. In one embodiment, each of CPUs 14 and 16 of FIG. 1 may include the components and functionality of core 30. Core 30 may include fetch and decode (FED) unit 32, map and dispatch unit 36, memory management unit (MMU) 40, core interface unit (CIF) 42, execution units 44, and load-store unit (LSU) 46. It is noted that core 30 may include other components and interfaces not shown in FIG. 2.

FED unit 32 may include circuitry configured to read instructions from memory and place them in level one (L1) instruction cache 34. L1 instruction cache 34 may be a cache memory for storing instructions to be executed by core 30. L1 instruction cache 34 may have any capacity and construction (e.g. direct mapped, set associative, fully associative, etc.). Furthermore, L1 instruction cache 34 may have any cache line size. FED unit 32 may also include branch prediction hardware configured to predict branch instructions and to fetch down the predicted path. FED unit 32 may also be redirected (e.g. via misprediction, exception, interrupt, flush, etc.).

FED unit 32 may be configured to decode the instructions into instruction operations. In addition, FED unit 32 may also be configured to decode multiple instructions in parallel. Generally, an instruction operation may be an operation that the hardware included in execution units 44 and LSU 46 is capable of executing. Each instruction may translate to one or more instruction operations which, when executed, result in the performance of the operations defined for that instruction according to the instruction set architecture. It is noted that the terms "instruction operation" and "uop" may be used interchangeably throughout this disclosure. In other embodiments, the functionality included within FED unit 32 may be split into two or more separate units, such as a fetch unit, a decode unit, and/or other units.

In various ISA's, some instructions may decode into a single uop. FED unit 32 may be configured to identify the type of instruction, source operands, etc., and each decoded instruction operation may comprise the instruction along with some of the decode information. In other embodiments in which each instruction translates to a single uop, each uop may simply be the corresponding instruction or a portion thereof (e.g., the opcode field or fields of the instruction). In some embodiments, the FED unit 32 may include any combination of circuitry and/or microcode for generating uops for instructions. For example, relatively simple uop generations (e.g., one or two uops per instruction) may be handled in hardware while more extensive uop generations (e.g., more than three uops for an instruction) may be handled in microcode.

Decoded uops may be provided to map/dispatch unit 36. Map/dispatch unit 36 may be configured to map uops and architectural registers to physical registers of core 30. Map/dispatch unit 36 may implement register renaming to map source register addresses from the uops to the source operand numbers identifying the renamed source registers. Map/dispatch unit 36 may also be configured to dispatch uops to reservation stations (not shown) within execution units 44 and LSU 46.

In one embodiment, map/dispatch unit 36 may include reorder buffer (ROB) 38. In other embodiments, ROB 38 may be located elsewhere. Prior to being dispatched, the uops may be written to ROB 38. ROB 38 may be configured to hold uops until they can be committed in order. Each uop may be assigned a ROB index (RNUM) corresponding to a specific entry in ROB 38. RNUMs may be used to keep track of the operations in flight in core 30. Map/dispatch unit 36 may also include other components (e.g., mapper array, dispatch unit, dispatch buffer) not shown in FIG. 2. Furthermore, in other embodiments, the functionality included within map/dispatch unit 36 may be split into two or more separate units, such as a map unit, a dispatch unit, and/or other units.

Execution units 44 may include any number and type of execution units (e.g., integer, floating point, vector). Each of execution units 44 may also include one or more reservation stations (not shown). CIF 42 may be coupled to LSU 46, FED unit 32, MMU 40, and an L2 cache (not shown). CIF 42 may be configured to manage the interface between core 30 and the L2 cache. MMU 40 may be configured to perform address translation and memory management functions.

LSU 46 may include L1data cache 48, store queue 50, and load queue 52. Load and store operations may be dispatched from map/dispatch unit 36 to reservation stations within LSU 46. Store queue 50 may store data corresponding to store operations, and load queue 52 may store data associated with load operations. LSU 46 may also be coupled to the L2 cache via CIF 42. It is noted that LSU 46 may also include other components (e.g., reservation stations, register file, prefetch unit, translation lookaside buffer) not shown in FIG. 2.

It should be understood that the distribution of functionality illustrated in FIG. 2 is not the only possible microarchitecture which may be utilized for a processor core. Other processor cores may include other components, omit one or more of the components shown, and/or include a different arrangement of functionality among the components.

Figure 3:
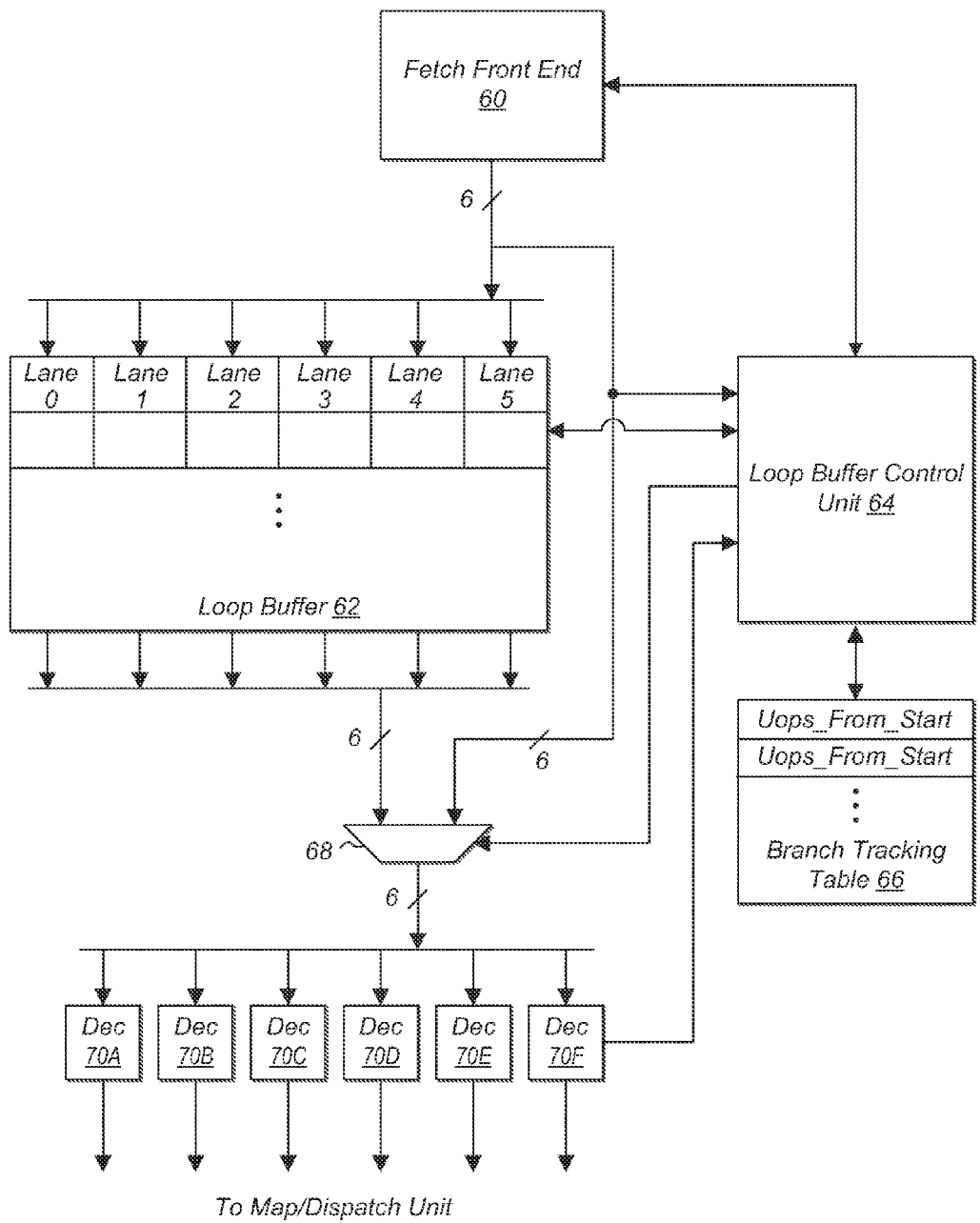
FIG. 3 is a block diagram illustrating one embodiment of a front end of a processor pipeline.

Referring now to FIG. 3, a block diagram of one embodiment of a front end of a processor pipeline is shown. In one embodiment, the front end logic shown in FIG. 3 may be located within a fetch and decode unit, such as FED Unit 32 (of FIG. 2). It should be understood that the distribution of functionality illustrated in FIG. 3 is only one possible structure to implement a loop buffer within a processor pipeline. Other suitable distributions of logic for implementing a loop buffer are possible and are contemplated.

Fetch front end 60 may be configured to fetch and pre-decode instructions and then convey pre-decoded uops to loop buffer 62 and the decoders 70A-F (via multiplexer 68). In one embodiment, fetch front end 60 may be configured to output six pre-decoded uops per cycle. In other embodiments, fetch front end 60 may be configured to output other numbers of pre-decoded uops per cycle.

Loop buffer 62, multiplexer 68, and decoder 70A-F may have six lanes for processing and/or storing six uops per cycle. Each lane may include a valid bit to indicate if the lane contains a valid uop. It is noted that the "lanes" of loop buffer 62, multiplexer 68, and decoder 70A-F may also be referred to as "slots" or "entries". In other embodiments, loop buffer 62, multiplexer 68, and decoder 70A-F may include more or fewer than six lanes, and fetch front end 60 may be configured to output as many uops per cycle as may be accommodated by the next stage of the pipeline.

Fetch front end 60 may expand instructions into uops and feed these uops to loop buffer 62 and multiplexer 68. In one embodiment, the instructions fetched by fetch front end 60 and decoded into pre-decoded uops may be based on the ARM ISA. Each pre-decoded uop may include instruction opcode bits, instruction predecode bits, and a uop number. The instruction opcode bits specify the operation that is to be performed. The predecode bits indicate the number of uops that the instruction maps to. The uop number represents which uop in a multi-uop instruction sequence should be generated. In other embodiments, other ISAs may be utilized, and the instructions may be decoded and formatted in a variety of manners.

When the processor is not in loop buffer mode, then the uops output from fetch front end 60 may be conveyed to decoders 70A-F via multiplexer 68. A select signal from loop buffer control unit 64 may be coupled to multiplexer 68 to determine which path is coupled through multiplexer 68 to the inputs of decoders 70A-F. When the processor is in loop buffer mode, uops may be read out of loop buffer 62 and conveyed to decoders 70A-F. Uops may be conveyed from the outputs of decoders 70A-F to the next stage of the processor pipeline. In one embodiment, the next stage of the processor pipeline may be a map/dispatch unit, such as map/dispatch unit 36 of FIG. 2.

Loop buffer control unit 64 may be configured to identify a loop within the fetched and pre-decoded instructions. Once a loop has been identified with some degree of certainty, then the loop may be cached in loop buffer 62, fetch front end 60 may be shutdown, and then the rest of the processor pipeline may be fed from loop buffer 62. In one embodiment, one iteration of the loop may be cached in loop buffer 62, and this cached iteration may be repeatedly dispatched down the pipeline. In another embodiment, multiple iterations of the loop may be cached in loop buffer 62.

To identify a loop for caching, first a backwards taken branch may be detected among the fetched instructions. A "backwards taken branch" may be defined as a taken branch that branches to a previous instruction in the instruction sequence. The instruction to which the backwards taken branch goes to may be considered the start of the loop. In one embodiment, only certain types of loops may be considered as candidates for buffering. For example, in one embodiment, for a loop candidate to be considered for buffering, all of the iterations of the loop have to be invariant. In other words, the loop candidate executes the same instruction sequence on each iteration. Furthermore, loops with indirect taken branches (e.g., BX—branch exchange, BLX—branch with link exchange) in the instruction sequence of the loop may be excluded from consideration for buffering. Still further, only one backwards taken branch per loop may be permitted. The rest of the branches in the loop should be forward branches. In other embodiments, all types of loops may be considered, such that all types of loops may be loop candidates, while the only criteria that may be enforced may be invariance of the loop. For example, more than one backwards taken branch may be allowed in a loop candidate, such as in a nested loop.

Loop buffer control unit 64 may monitor the instruction stream for instructions that form loops that meet the criteria for loop buffering. Loop buffer control unit 64 may capture all of the information of what a given loop candidate looks like. For a certain period of time, the loop candidate may be tracked over multiple iterations to make sure that the loop candidate stays the same. For example, the distances from the start of the loop to one or more instructions within the loop may be recorded on a first iteration and monitored on subsequent iterations to determine if these distances remain the same.

In some embodiments, even if the loop candidate is invariant and meets the other criteria listed above, other characteristics of the loop candidate may disqualify it from being cached in loop buffer 62. For example, if the size of the loop candidate is too large to fit in loop buffer 62, then the loop candidate may be disqualified. Also, there may be a maximum allowable number of taken branches within the loop, equal to the size of branch tracking table 66. If the number of taken branches exceeds this number, then the loop may be excluded from consideration as a candidate for caching in loop buffer 62. In one embodiment, branch tracking table 66 may include eight entries for taken branches within a loop. In other embodiments, branch tracking table 66 may have more or less than eight entries for taken branches within a loop. Once a loop candidate has been disqualified from being cached in loop buffer 62, the instruction address of the backwards taken branch for this disqualified loop candidate may be recorded. Therefore, if this backwards taken branch is detected again, the loop tracking logic may ignore this branch and restart only when a new backwards taken branch is detected.

In one embodiment, once the same backwards taken branch has been detected more than once, then a state machine to capture the information for that loop may be started by loop buffer control unit 64. For example, loop buffer control unit 64 may utilize branch tracking table 66 to track the taken branches of a loop candidate. Branch tracking table 66 may keep track of the distance from the start of the loop to each taken branch. In one embodiment, the distance may be measured in uops. In another embodiment, the distance may be measured in instructions. In other embodiments, the distance may be measured using other metrics, and/or a combination of two or more metrics. Measuring the distance from the start of the loop to each taken branch is a way to determine that the path through the underlying code has not changed.

If each iteration of the loop executes such that there are the same number of uops from the start of the loop to each branch, then the loop candidate may be considered invariant. The distance to each branch in table 66 may be tracked for a certain number of iterations before determining the loop candidate is invariant and should be cached. The amount of time allocated for tracking the invariance of the loop candidate may be based on a number of loop iterations and/or on a number of branches encountered.

In one embodiment, the only taken branches that are allowable within a loop candidate may be conditional branches which have the same target. In this embodiment, indirect branches may not be supported since an indirect branch may have a different target on different iterations of the loop. It is possible that an indirect branch may take two different paths through the code on two separate iterations but the loop may still be considered by loop buffer control unit 64 to be invariant. This may occur because it is possible that the distances would be the same even though the loop took two different paths on the two separate iterations. This would lead to the false determination that the loop is invariant. To prevent these false positives, indirect branches may not be supported. Therefore, in this embodiment, loop buffer control unit 64 may only allow branches within a loop candidate that have the same target on each loop iteration.

In another embodiment, indirect branches may be supported and may be allowable within loop candidates. In this embodiment, branch tracking table 66 may also include information indicating the target of each taken branch, to ensure that the loop is invariant. During each iteration of the loop candidate, the target of each branch in the loop may be compared to the value stored in table 66 to ensure the target has not changed. In further embodiments, additional information may be included in branch tracking table 66 to ensure the loop contents are invariant.

In one embodiment, the decoders 70A-F may detect a branch and signal this to loop buffer control unit 64. In another embodiment, fetch front end 60 may detect a branch and convey an indication of the detection to unit 64. Alternatively, in a further embodiment, unit 64 may monitor the instruction stream for branches and detect branches independently of decoders 70A-F or fetch front end 60. Unit 64 may include a uop counter (not shown) that counts the number of uops from the start of the loop. On the first iteration of the loop, unit 64 may write the value of the uop counter to branch tracking table 66 whenever a branch is detected in the loop. A pointer to table 66 may also be incremented each time a branch is detected, to move to the next entry in table 66. On subsequent iterations of the loop, whenever a branch is detected, the value of the uop counter may be compared to the value in the corresponding entry in table 66. Each entry of table 66 may include a value representing a number of uops from the start of the loop for a respective branch. Each entry may also include a valid bit to indicate that entry corresponds to a taken branch in the loop. In other embodiments, each entry of table 66 may include other information, such as a branch identifier or tag, a target of the branch, and/or other information.

In one embodiment, any time a mispredicted branch is detected, then a reset signal may be conveyed to loop buffer control unit 64. Also, anytime there is an event signaled from the backend that redirects fetch front end 60, loop buffer control unit 64 may flush and restart the candidate detection logic. These scenarios will typically result in the program breaking out of whatever stream of code is being tracked by unit 64.

After a certain predetermined period of time, unit 64 may determine that the loop candidate should be cached in loop buffer 62. The length of the predetermined period of time may be based on one or more of a variety of factors. For example, in one embodiment, the predetermined period of time may be measured by a certain number of iterations of the loop. If the number of iterations while the loop has been invariant is above a threshold, then the loop may be cached in the loop buffer 62. Alternatively, the period of time may be based on a number of taken branches that have been detected. For example, if the loop candidate includes 8 taken branches, then a count of 40 such branches may be used to indicate a particular number of iterations (5 in this example) have occurred. In one embodiment, the predetermined period of time may be based on providing the branch predictor with enough time to predict the end of the loop. Numerous ways of tracking such iterations are possible and are contemplated.

Figure 4:
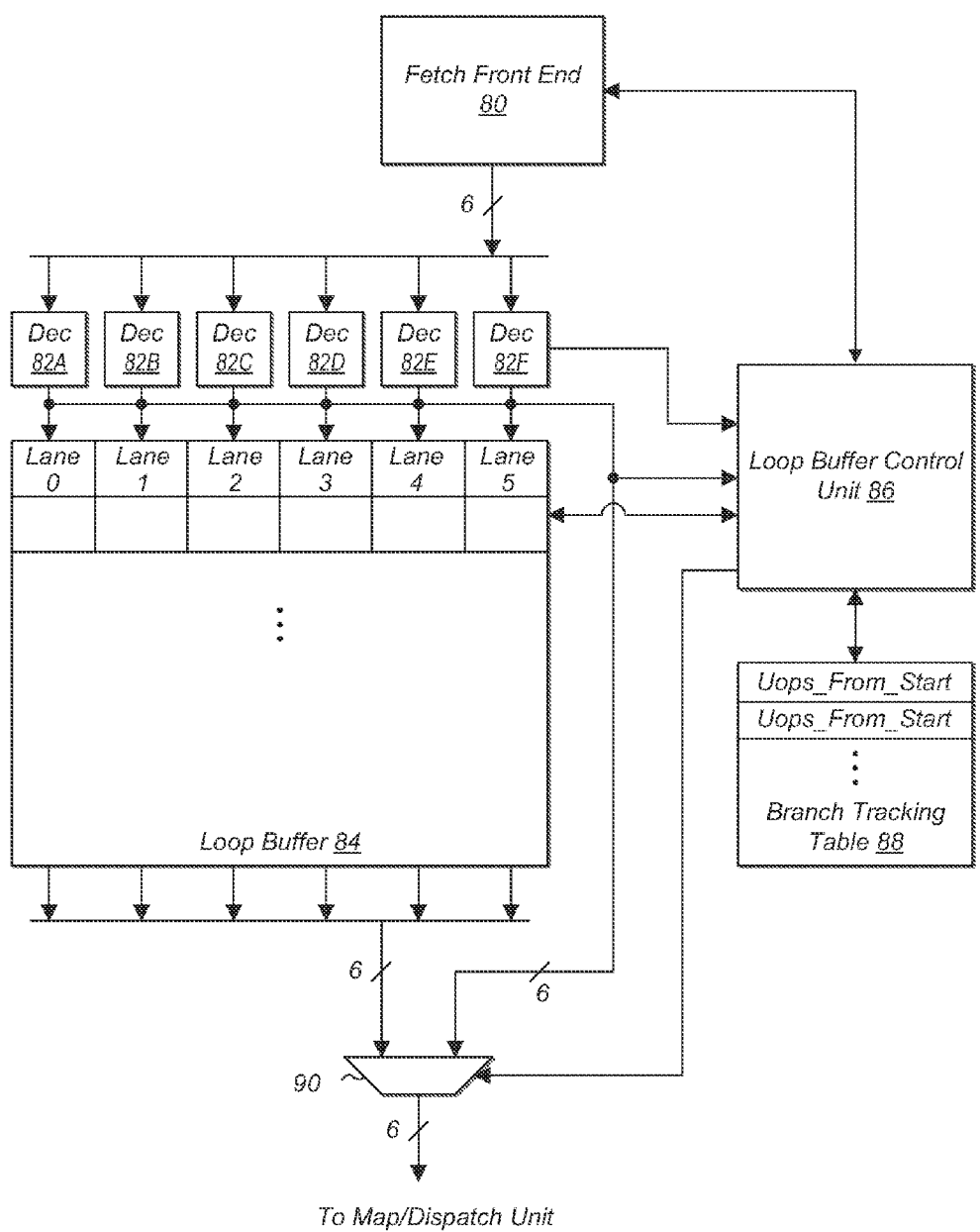
FIG. 4 illustrates a block diagram of another embodiment of a loop buffer within a fetch and decode unit.

Turning now to FIG. 4, another embodiment of a loop buffer within a fetch and decode unit is shown. In one embodiment, loop buffer 84 may be located downstream from decoders 82A-F in the processor pipeline, as shown in FIG. 4. This is in contrast to loop buffer 62 (of FIG. 3) which is located in the processor pipeline prior to decoders 70A-F. Fetch front-end 80 may fetch instructions and pre-decode the fetched instructions into pre-decoded uops. Then, the pre-decoded uops may be conveyed to decoders 82A-F. In one embodiment, fetch front-end 80 may be configured to generate and convey six pre-decoded uops per cycle to the six lanes of decoders 82A-F.

Decoders 82A-F may decode the pre-decoded uops into decoded uops. Then, decoders 82A-F may convey the decoded uops to the next stage of the processor pipeline via multiplexer 90. Also, decoders 82A-F may convey uops to loop buffer 84 when a loop candidate has been identified and has met the criteria for being cached into loop buffer 84. The outputs of multiplexer 90 may be coupled to the next stage of the processor pipeline. In one embodiment, the next stage of the processor pipeline may be a map/dispatch unit.

Loop buffer 84, loop buffer control unit 86, and branch tracking table 88 may be configured to perform functions similar to those described in relation to the processor front end shown in FIG. 3. One key difference in FIG. 4 is that loop buffer 84 may store decoded uops as opposed to loop buffer 62 storing pre-decoded uops in FIG. 3. Therefore, loop buffer 84 may be of larger size than loop buffer 62 to accommodate the larger amount of data, since decoded uops typically have more information than pre-decoded uops. It is noted that loop buffer 84 may also be located at other locations within a processor pipeline, in addition to the two locations shown in FIGS. 3 and 4. For example, loop buffer 84 may be located within a fetch front end, or alternatively, loop buffer 84 may be located within a map/dispatch unit. Depending on where the loop buffer is located in the pipeline, the contents of the loop that are stored in the loop buffer may vary based on the amount of instruction processing that has been performed at that point in the pipeline.

In one embodiment, on an initial iteration of a loop candidate, loop buffer control unit 86 may populate branch tracking table 88 with the distance from the start of the loop to each taken branch of the loop. On subsequent iterations of the loop, control unit 86 may determine if each branch is the same distance from the start of the loop as the corresponding distance stored in table 88. After a loop candidate has been invariant for a certain number of iterations, then the loop candidate may be cached in loop buffer 84 and fed to the rest of the pipeline from loop buffer 84. Fetch front end 80 and decoders 82A-F may be powered down while the loop is being dispatched out of loop buffer 84 to the rest of the processor pipeline.

Referring now to FIG. 5, one embodiment of a sample loop is shown. It is noted that the program code of loop 100 shown in FIG. 5 is utilized for illustrative purposes. Other loops may be structured differently with other numbers of instructions and branches.

Loop 100 may begin at instruction address 0001 with instruction 102. Instruction 102 is followed by instruction 104, and these instructions may be any type of non-branching instructions that are defined in the ISA. Branch 106 may follow instruction 104, and branch 106 may be a forward branch that branches to instruction address 0025.

As shown in table 120, the instructions 102 and 104 and branch 106 may each be cracked into a single uop. This is purely for illustrative purposes, and instructions within a program or loop may correspond to any number of uops, and the examples shown in table 120 are for illustrative purposes only. It is noted that table 120 showing the uops per instruction is not a table utilized or stored by the processor pipeline, but is shown in FIG. 5 for the purposes of this discussion.

Branch 106 is the first forward branch encountered in loop 100, and the number of uops from the start of loop 100 may be entered in branch tracking table 130. Therefore, based on the two instructions, each with only one uop, the first value stored in branch tracking table 130 may be two. Branch 106 may jump to instruction address 0025, which corresponds to instruction 108. Instruction 108 may be any type of non-branch instruction. Then, after instruction 108, another forward branch may be executed, in this case branch instruction 110. As can be seen in table 120, instruction 108 is cracked into three uops. Therefore, the value written to the second entry of branch tracking table 130 may be six for the number of uops from the start of the loop to branch 110.

Branch 110 may jump to instruction 112 at instruction address 0077. Instruction 112 may be followed by instruction 114 and then branch 116. Branch 116 is a backwards taken branch such that it branches back to a previous address in the instruction sequence. Instruction 112 cracks into two uops and instruction 114 cracks into four uops, as shown in table 120. Therefore, the distance in uops from the start of the loop to branch 116 is 13, and this value may be stored in the third entry of branch tracking table 130.

When branch 116 is detected for the first time, this may trigger a state machine within a loop buffer control unit to start tracking loop 100 as a loop buffer candidate. The loop buffer control unit may determine the number of uops in the loop 100 and the number of branches in the loop 100. If both of these values are less than the thresholds that are supported by the loop hardware, then branch tracking table 130 may be populated on the next iteration of loop 100. Alternatively, branch tracking table 130 may be populated on the first iteration of loop 100 after detecting branch 116. If loop 100 does not meet all of the criteria required by the loop hardware for loop candidates, then loop tracking may be abandoned. If loop 100 meets all of the criteria, then, on subsequent iterations of loop 100, whenever a branch is encountered, the corresponding value in table 130 may be read out and compared with the distance in uops from the start of the loop.

It is noted that for other loops, table 130 may include other numbers of valid entries depending on the number of branches in the loop. It is also noted that in other embodiments, the distance stored in branch tracking table 130 may be measured in other values besides uops. For example, in another, the distances stored in table 130 may be measured in instructions. Furthermore, in other embodiments, branch tracking table 130 may include other fields of information in each entry. For example, there may be a valid bit for each entry to indicate if the entry corresponds to a branch in the loop candidate and contains a valid distance. In the example shown in FIG. 5 for table 130 and loop 100, only the first three entries would have a valid bit set to '1' and the rest of the valid bits in the other entries may be set to '0'. Furthermore, in other embodiments, a branch target address may be stored in each entry.

Figure 6:
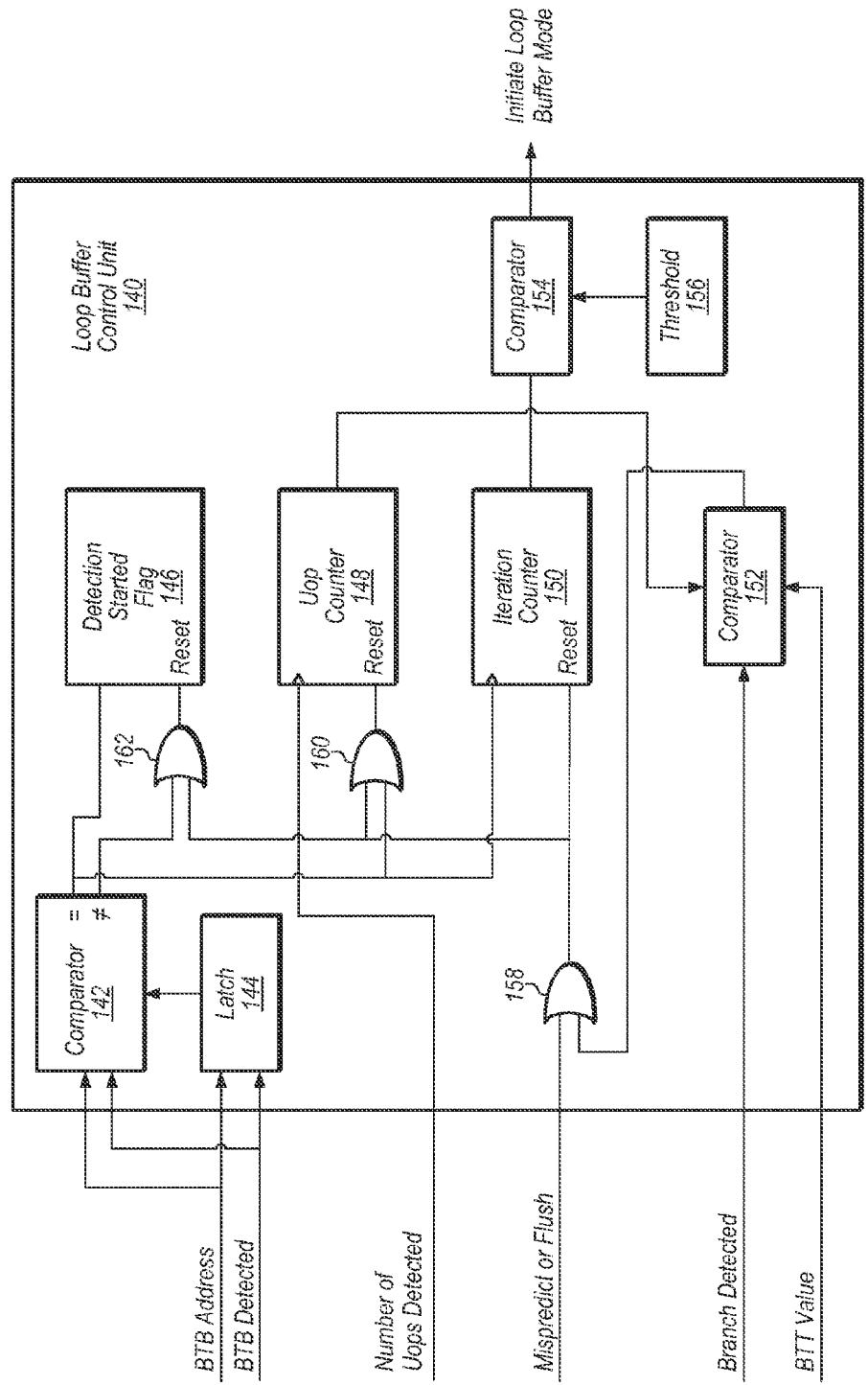
FIG. 6 illustrates one embodiment of a loop buffer control unit.

Turning now to FIG. 6, a block diagram of one embodiment of a loop buffer control unit 140 is shown. Unit 140 may include comparator 142, which may compare a backwards taken branch (BTB) instruction address of a current BTB instruction with an instruction address from latch 144. Latch 144 may hold the most recently encountered BTB instruction address, and this may be compared to the current BTB instruction address. Latch 144 and comparator 142 may receive a signal indicating a backwards taken branch (BTB) has been detected. Latch 144 and comparator 142 may also receive the instruction address of the detected BTB. Latch 144 may store the instruction of the address of the most recent backwards taken branch (BTB). Then, the next time a BTB is detected, the instruction address of the BTB may be compared with the instruction address of the previous BTB stored in latch 144. Alternatively, in another embodiment, latch 144 may be a register or other unit of memory. Comparator 142 provides an indication that a loop may have been detected in the instructions stream.

In one embodiment, comparator 142 may have two outputs, a first output indicating equality and a second output indicating inequality. The first output, indicating equality, may be coupled to detection started flag 146, OR-gate 160, and iteration counter 150. The equality output from comparator 142 may be a pulse for one or more clock cycles that indicates a BTB has been detected and that the BTB has been seen at least twice in a row. The equality output from comparator 142 may increment iteration counter 150, and iteration counter 150 may provide a count of the number of loop iterations that have been detected in the instruction stream. For this embodiment, if the same BTB is encountered twice in a row, with no other BTBs in between, then this indicates a loop candidate has been encountered. Therefore, the loop tracking circuitry may be started to learn more about the loop candidate.

The second output from comparator 142, indicating inequality, may be coupled to OR-gate 162. The output of OR-gate 162 may be coupled to reset the detection started flag 146. The second output from comparator 142 may be high when the currently detected BTB is different than the previously detected BTB. This indicates that the previous BTB was not part of a loop candidate for this embodiment. Although not shown in FIG. 6, the second output from comparator 142 may also be coupled to other locations to indicate that loop detection has been reset.

Uop counter 148 may be configured to keep track of the number of uops that have been detected since the start of the loop candidate. One or more signals may be coupled to uop counter 148 indicating the number of uops that have been detected. These input(s) to uop counter 148 may indicate a number of uops that have been fetched and/or decoded. In one embodiment, the signal(s) may come from a fetch unit. In one embodiment, if the fetch unit outputs six decoded uops per clock, then a high input coupled to uop counter 148 may cause uop counter 148 to increment its count by six. In another embodiment, these signals may be coupled to uop counter 148 from the decoder units.

Uop counter 148 may also include other logic for determining the number of uops to the specific uop corresponding to a branch. When a branch is encountered, uop counter 148 may also receive an input indicating the lane in which the uop was located. Then, uop counter 148 may determine how many of the uops of the most recent cycle were in front of the branch uop. In this way, uop counter 148 may generate an accurate count of the number of uops from the start of the loop to the specific branch uop corresponding to the branch that was detected. Uop counter 148 may be reset if the BTB is detected (signifying the end of the loop), if a mispredict or flush is signaled from the backend of the processor, or if comparator 152 signals an inequality was detected on a branch distance.

Iteration counter 150 may be configured to keep track of the number of iterations of the loop that have fetched and/or decoded. Iteration counter 150 may be reset if a mispredict or flush is signaled from the backend of the processor or if the distance to one of the branches of the loop is different from the stored value in the branch tracking table (not shown). This may be indicated by comparator 152, which may generate a signal indicating inequality if the current uop counter value for a detected branch is not equal to the corresponding value stored in the branch tracking table (BTT). Comparator 152 may receive a branch detected signal and the value from the BTT for the current branch of the loop. Comparator 152 may compare the BTT value to the current uop counter value and output the result of this comparison. If the comparison results in an inequality, then the loop detection logic may be reset.

In one embodiment, comparator 154 may be configured to compare the output of iteration counter 150 with a threshold 156. When the iteration counter 150 matches or exceeds the threshold 156, comparator 154 may output a signal that initiates loop buffer mode for the processor. In this embodiment, the loop candidate may be tracked over multiple iterations before loop buffer mode is initiated, and the number of iterations required for tracking may be indicated by threshold 156. In various embodiments, the threshold 156 is a programmable value. In one embodiment, the value of the threshold may be based on the time or number of cycles needed for the processor's branch prediction mechanism to detect the end of the loop. In some embodiments, the branch prediction mechanism may be shutdown while the processor is in loop buffer mode.

In another embodiment, the number of branches may be counted, and when the number of branches reaches a threshold, then loop buffer mode may be initiated. For example, if a loop has five branches, and the branch threshold is 40, then the loop candidate would require eight iterations to reach the branch threshold. In other embodiments, other ways of determining how long to track a loop candidate before initiating loop buffer mode may be utilized. For example, in another embodiment, if either a certain number of branches or a certain number of iterations are reached, then the processor may enter loop buffer mode.

Although unit 140 is shown as receiving various signals, such as BTB detected, number of uops detected, and branch detected, in another embodiment, unit 140 may generate these signals internally by monitoring the uops that are traversing the processor pipeline. It should also be understood that the distribution of functionality illustrated in FIG. 6 is not the only possible distribution of logic for implementing a loop buffer control unit within a processor pipeline. Other embodiments may include other components and logic and have any suitable distribution of these components and logic. Furthermore, each of the individual components may be replaced by one or more similar components that may be configured differently depending on the embodiment. For example, in the embodiment shown in FIG. 6, only one backwards taken branch is allowable within a loop candidate. However, in other embodiments, a loop candidate may include more than one backwards taken branch, and the logic of the loop buffer control unit may be modified accordingly.

Figure 7:
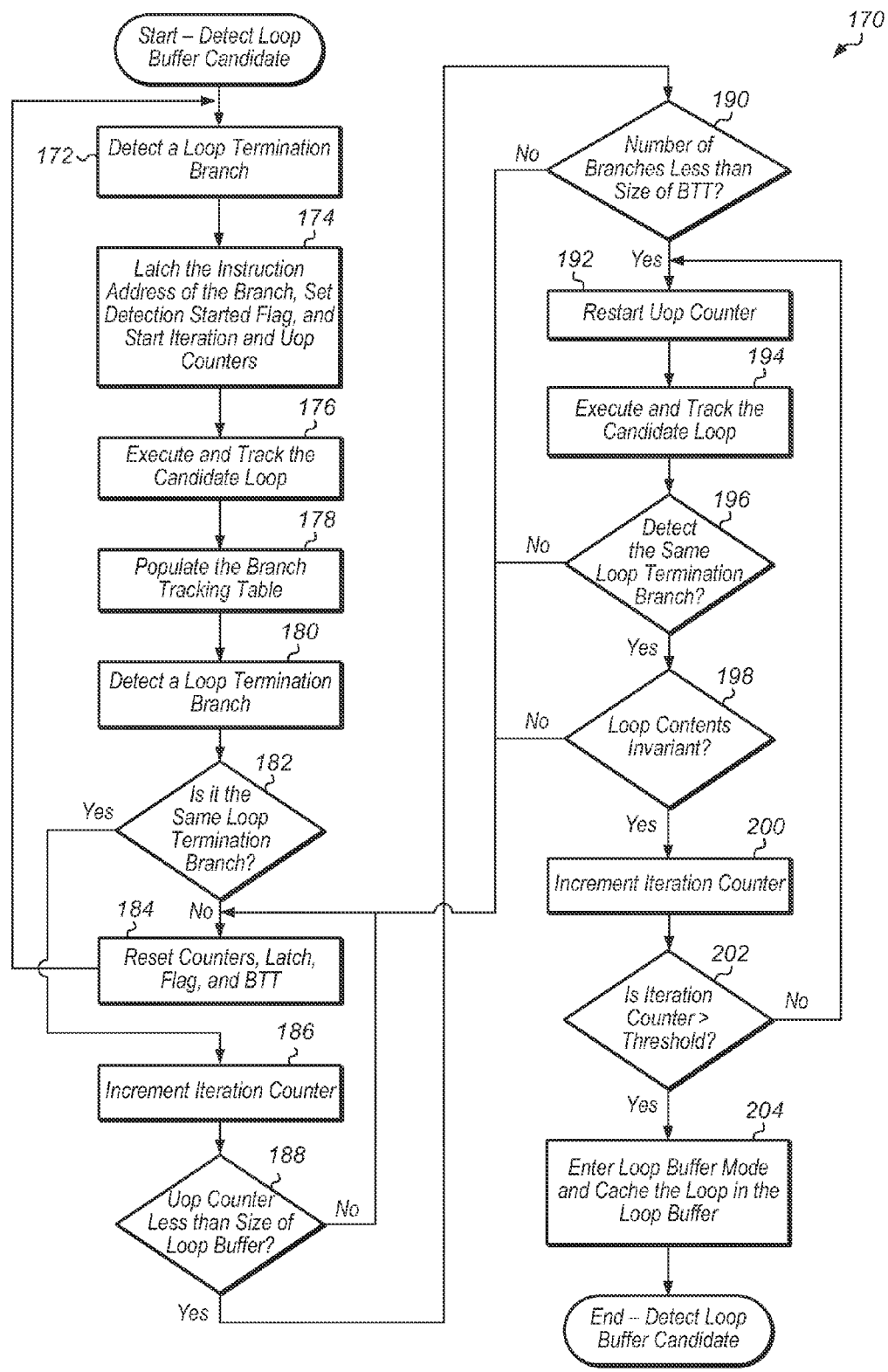
FIG. 7 is a generalized flow diagram illustrating one embodiment of a method for tracking a loop candidate.

Referring now to FIG. 7, one embodiment of a method for tracking a loop candidate is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a loop termination branch may be detected in a processor pipeline (block 172). In various embodiments, a loop termination branch may be defined as a direct backwards taken branch excluding subroutine calls. In various embodiments, the loop termination branch may be detected in a fetch stage, in a decoder stage, or in another stage of the processor pipeline. The loop termination branch uop may be marked so that it may be identified as the end of a possible loop buffer candidate.

In response to detecting the loop termination branch, the instruction address of the loop termination branch may be latched in a loop buffer control unit, a detection started flag may be set, an iteration counter may be started, and a uop counter may be started (block 174). The iteration counter may be utilized to keep track of the number of iterations of the loop. Also, in some embodiments, a branch counter may be started to keep track of the number of branches that have been detected in all of the iterations of the loop candidate. The value of the iteration counter and/or the value of the branch counter may be utilized to determine when to initiate loop buffer mode. When loop buffer mode is initiated, the loop candidate may be cached in the loop buffer and the fetch front end may be shutdown. The uop counter may be utilized for determining the distance (in number of uops) to each branch that is detected within the loop candidate.

It is noted that in one embodiment, the count maintained by the uop counter may include vacant slots that are generated as part of the fetch and decode stages. In this embodiment, it may be assumed for the purposes of this discussion that the fetch unit is configured to output six uops per cycle. For some clock cycles, the fetch unit may not generate a full six uop output for a variety of reasons. Therefore, a row of uops sent to the decoder units may not include a full row of valid uops. The uops counter may take this into account and count six for each row even if the row does not contain six valid uops. For example, a loop may include six rows of uops, and the loop termination branch may be the last slot of the last row of the sixth cycle of uops generated. The uop counter may count that the loop has 36 uops for the six cycles, even if one or more of the rows contained less than six valid uops. For example, an intermediate row may only contain two valid uops, and the remaining four slots of the row may be empty. Therefore, the loop would include 32 valid uops, but the loop counter will count that the loop includes 36 uops. Generally speaking, in this embodiment, the uop counter may keep track of how many slots will be needed in the loop buffer to store the loop candidate even if some of these slots do not contain valid uops.

After setting up the counters and any additional tracking logic, the loop candidate may be executed and tracked (block 176). In one embodiment, tracking the loop candidate may include detecting branches in the loop candidate and populating a branch tracking table with distances from the start of the loop to each detected branch (block 178). Next, a loop termination branch may be detected at the end of the loop candidate (block 180). If the loop termination branch is the same branch that was previously detected (conditional block 182), then the iteration counter may be incremented (block 186).

If the loop termination branch is not the same branch that was previously detected (conditional block 182), then tracking of the loop candidate may be stopped and the counters, latch, detection started flag, and branch tracking table may be reset (block 184). Also, tracking of the loop candidate may be terminated if any excluded instructions are detected in the loop. After block 184, method 170 may reset and wait for a loop termination branch to be detected (block 172).

After block 186, the uop counter may be compared to the size of the loop buffer (conditional block 188) to determine if the loop candidate can fit in the loop buffer. Alternatively, in another embodiment, these steps of method 170 may be reordered. For example, if it is determined that the uop counter exceeds the size of the loop buffer (conditional block 188) prior to detecting a loop termination branch (block 180), then loop detection may be cancelled.

If the uop counter is less than the size of the loop buffer (conditional block 188), then the loop candidate can fit in the loop buffer, and so the next condition may be checked, if the number of branches in the loop candidate is less than the size of the branch tracking table (BTT) (conditional block 190). If the uop counter is greater than the size of the loop buffer (conditional block 188), then the loop candidate is too large to fit in the loop buffer and tracking may be terminated. Method 170 may return to block 184 and the counters, latch, detection started flag, and branch tracking table may be reset.

If the number of branches in the loop candidate is less than the size of the BTT (conditional block 190), then the loop candidate is still in consideration, and the uop counter may be restarted (block 192). Then, another iteration of the loop may be executed and tracked (block 194). Tracking the iteration of the loop may include monitoring the taken branches and the number of uops from the start of the loop to each taken branch. The distance to each taken branch from the start of the loop may be compared to the values stored in the branch tracking table.

When an iteration of the loop completes, a loop termination branch should be detected, and it may be determined if it is the same loop termination branch (conditional block 196). Alternatively, if the loop termination branch is not detected, loop tracking may be terminated by monitoring the uop counter and the last entry in the branch tracking table and determining the loop termination branch should have already been detected. If the loop termination branch is detected and it is the same loop termination branch (conditional block 196), then it may be determined if the loop contents were invariant for this iteration of the loop (conditional block 198).

Alternatively, conditional block 198 may be checked prior to conditional block 196 in some scenarios. For example, it may be determined that the loop contents have changed prior to detecting the loop termination branch if one of the branches of the loop is not at the same distance from the start of the loop as the value stored in the branch tracking table. In this case, tracking of the loop may be terminated prior to detecting the same loop termination branch.

If the loop contents were invariant for this iteration of the loop (conditional branch 198), then this indicates the same loop is being executed, and then the iteration counter may be incremented (block 200). Then, it may be determined if the iteration counter is above a threshold to determine if the loop has been tracked long enough for the loop to be buffered (conditional block 202). Alternatively, in another embodiment, a branch counter may be compared to a threshold to determine if the processor should enter loop buffer mode.

If the iteration counter is below the threshold (conditional block 202), then method 170 may restart the uop counter (block 192). If the iteration counter is above the threshold (conditional block 202), then the processor may enter loop buffer mode and the loop may be cached in the loop buffer (block 204). After block 204, method 170 may end. At this point, the front end of the processor may be turned off and uops may be dispatched out of the loop buffer. When the loop terminates, the processor may convey a signal to exit loop buffer mode and the front end of the processor may be turned back on. At this point, method 170 may be restarted, and the loop buffer control unit may go back to monitoring the instruction stream for loop termination branches (block 172).

Figure 8:
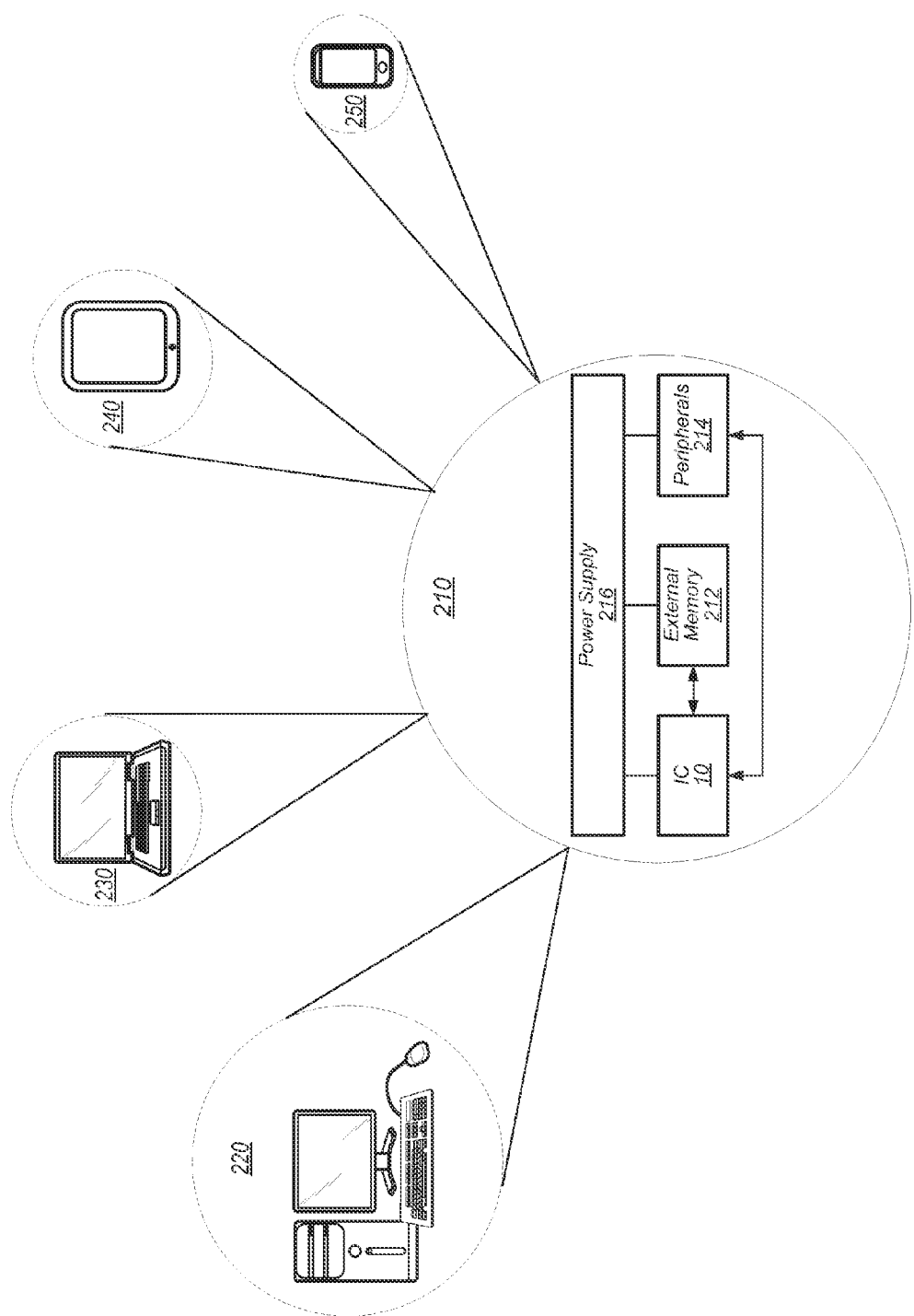
FIG. 8 is a block diagram of one embodiment of a system.

Referring next to FIG. 8, a block diagram of one embodiment of a system 210 is shown. As shown, system 210 may represent chip, circuitry, components, etc., of a desktop computer 220, laptop computer 230, tablet computer 240, cell phone 250, or otherwise. In the illustrated embodiment, the system 210 includes at least one instance of IC 10 (of FIG. 1) coupled to an external memory 212.

IC 10 is coupled to one or more peripherals 214 and the external memory 212. A power supply 216 is also provided which supplies the supply voltages to IC 10 as well as one or more supply voltages to the memory 212 and/or the peripherals 214. In various embodiments, power supply 216 may represent a battery (e.g., a rechargeable battery in a smart phone, laptop or tablet computer). In some embodiments, more than one instance of IC 10 may be included (and more than one external memory 212 may be included as well).

The memory 212 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

The peripherals 214 may include any desired circuitry, depending on the type of system 210. For example, in one embodiment, peripherals 214 may include devices for various types of wireless communication, such as wifi, Bluetooth, cellular, global positioning system, etc. The peripherals 214 may also include additional storage, including RAM storage, solid state storage, or disk storage. The peripherals 214 may include user interface devices such as a display screen, including touch display screens or multitouch display screens, keyboard or other input devices, microphones, speakers, etc.

Figure 9:
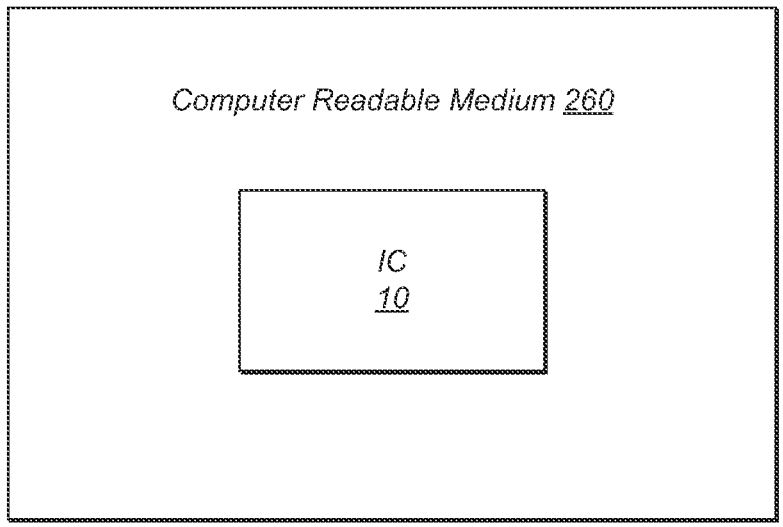
FIG. 9 is a block diagram of one embodiment of a computer readable medium.

Turning now to FIG. 9, one embodiment of a block diagram of a computer readable medium 260 including one or more data structures representative of the circuitry included in IC 10 (of FIG. 1) is shown. Generally speaking, computer readable medium 260 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 260 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 230 may be the netlist(s) (with or without the synthesis library) or the data set(s), as desired. In yet another alternative, the data structures may comprise the output of a schematic program, or netlist(s) or data set(s) derived therefrom.

While computer readable medium 260 includes a representation of IC 10, other embodiments may include a representation of any portion or combination of portions of IC 10 (e.g., loop buffer, loop buffer control unit).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
 a loop buffer configured to store instruction operations, wherein instruction operations are dispatched from the loop buffer responsive to detecting the apparatus is in a loop buffer mode; and
 a loop buffer control unit coupled to the loop buffer, wherein the loop buffer control unit is configured to:
  detect a first loop termination branch comprising a backward taken branch to an instruction that is a start of a loop candidate;
  in response to detecting the first loop termination branch, determine whether an indication is stored that indicates the loop candidate was disqualified from being cached in the loop buffer during tracking of the loop candidate on a previous encounter of the loop candidate;
in response to determining said indication is stored, ignore the loop candidate and forego tracking of the loop candidate;
in response to determining said indication is not stored, track the loop candidate, wherein to track the loop candidate the loop buffer control unit is configured to:
store an identification of the first loop termination branch;
track a number of instructions executed from a start of the loop candidate to each taken branch within the loop candidate;
responsive to detecting a number of instructions executed from the start of the loop candidate to each of the taken branches is invariant for at least a given number of iterations of the loop candidate, cache the loop candidate in the loop buffer and initiate the loop buffer mode; and
responsive to detecting the number of instructions executed from the start of the loop candidate to each of the taken branches is not invariant:
terminate tracking of the loop candidate; and
store an indication that the loop candidate is disqualified from being cached in the loop buffer.

2. The apparatus as recited in claim 1, further comprising a fetch unit and an instruction cache, wherein the apparatus is configured to shut down at least one of the fetch unit and the instruction cache responsive to the loop buffer mode being initiated.

3. The apparatus as recited in claim 1, wherein instruction operations are dispatched from the loop buffer to a decode unit when the apparatus is in the loop buffer mode.

4. The apparatus as recited in claim 1, wherein when tracking the loop candidate, the loop buffer control unit is further configured to terminate tracking of the loop candidate responsive to detecting a second loop termination branch that is not the first loop termination branch.

5. The apparatus as recited in claim 1, wherein said indication comprises an instruction address of the loop termination branch.

6. The apparatus as recited in claim 1, further comprising a branch predictor, wherein the given number of iterations corresponds to a number of iterations greater than a threshold, and wherein the threshold is based on an amount of time selected to provide the branch predictor a sufficient amount of time to predict an end of loop candidate.

7. The apparatus as recited in claim 1, further comprising a branch tracking table, wherein to detect a number of instructions executed from the start of the loop candidate to each of the taken branches is invariant, the branch tracking table comprises an entry for each taken branch of a plurality of taken branches within the loop candidate, and wherein each entry includes a value which corresponds to a distance from the start of the loop candidate to the respective taken branch of the plurality of taken branches.

8. A processor comprising:
a fetch unit configured to fetch instructions;
a loop buffer; and
a loop buffer control unit coupled to the loop buffer;
wherein the loop buffer control unit is configured to:
detect a first loop termination branch comprising a backward taken branch to an instruction that is a start of a loop candidate;
in response to detecting the first loop termination branch, determine whether an indication is stored that indicates the loop candidate was disqualified from being cached in the loop buffer during tracking of the loop candidate on a previous encounter of the loop candidate;
in response to determining said indication is stored, ignore the loop candidate and forego tracking of the loop candidate;
in response to determining said indication is not stored, track the loop candidate, wherein to track the loop candidate, the loop buffer control unit is configured to:
store an identification of the first loop termination branch;
track a number of instructions executed from a start of the loop candidate to each taken branch within the loop candidate;
responsive to detecting a number of instructions executed from the start of the loop candidate to each of the taken branches is invariant for at least a given number of iterations of the loop candidate, cache the loop candidate in the loop buffer and initiate a loop buffer mode whereby the fetch unit stops fetching instructions and instructions are dispatched from the loop buffer; and
responsive to detecting the number of instructions executed from the start of the loop candidate to each of the taken branches is not invariant:
terminate tracking of the loop candidate; and
store an indication that the loop candidate is disqualified from being cached in the loop buffer.

9. The processor as recited in claim 8, wherein the one or more instructions that are tracked comprise one or more taken branches.

10. The processor as recited in claim 8, wherein the start of the loop candidate is identified as an instruction after the backwards taken branch.

11. The processor as recited in claim 8, wherein only one backwards taken branch is allowed in a loop candidate.

12. The processor as recited in claim 8, further comprising a map and dispatch unit, wherein instruction operations are dispatched from the loop buffer to the map and dispatch unit when the loop candidate is stored in the loop buffer.

13. The processor as recited in claim 9, wherein the loop buffer control unit is further configured to terminate monitoring and tracking of the loop candidate responsive to detecting a distance from the start of the loop candidate to any taken branch has changed on any subsequent iteration of the loop candidate.

14. The processor as recited in claim 8, wherein the loop buffer control unit is further configured to terminate monitoring and tracking of the loop candidate responsive to detecting the loop candidate is unable to fit in the loop buffer.

15. A method comprising:
detecting a first loop termination branch comprising a backward taken branch to an instruction that is a start of a loop candidate;
in response to detecting the first loop termination branch, determining whether an indication is stored that indicates the loop candidate was disqualified from being cached in the loop buffer during tracking of the loop candidate on a previous encounter of the loop candidate;

in response to determining said indication is stored, ignoring the loop candidate and foregoing tracking of the loop candidate;

in response to determining said indication is not stored indicating the loop candidate comprising the first loop termination branch has been previously disqualified from being cached in the loop buffer, initiating tracking of the loop candidate, wherein said tracking comprises:

storing an identification of the first loop termination branch;

tracking a number of instructions executed from a start of the loop candidate to each taken branch within the loop candidate;

responsive to detecting a number of instructions executed from the start of the loop candidate to each of the taken branches is invariant for at least a given number of iterations of the loop candidate, caching the loop candidate in a loop buffer and initiating a loop buffer mode whereby instructions are dispatched from the loop buffer; and responsive to detecting the number of instructions executed from the start of the loop candidate to each of the taken branches is not invariant:

terminating tracking of the loop candidate; and storing an indication that the loop candidate is disqualified from being cached in the loop buffer.

16. The method as recited in claim 15, wherein said tracking further comprises terminating tracking of the loop candidate responsive to detecting a second loop termination branch that is not the first loop termination branch.

17. The method as recited in claim 15, further comprising dispatching the loop candidate from the loop buffer to a next stage of a processor pipeline responsive to caching the loop candidate in the loop buffer.

18. The method as recited in claim 17, wherein the next stage of the processor pipeline is a decode unit.

19. The method as recited in claim 17, wherein the next stage of the processor pipeline is a map and dispatch unit.

* * * * *